(12) United States Patent
Sheradin et al.

(10) Patent No.: US 12,470,155 B2
(45) Date of Patent: Nov. 11, 2025

(54) POWER ELECTRONICS FOR VOLTAGE BOOST CHARGING

(71) Applicant: Schaeffler Technologies AG & Co. KG, Herzogenaurach (DE)

(72) Inventors: Jacob Sheradin, North Canton, OH (US); Eric Ubelhart, Orrville, OH (US); Peter Rentfrow, Doylestown, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 206 days.

(21) Appl. No.: 18/382,903

(22) Filed: Oct. 23, 2023

(65) Prior Publication Data

US 2025/0132692 A1 Apr. 24, 2025

(51) Int. Cl.
*H02M 7/538* (2007.01)
*H02M 1/088* (2006.01)
*H02M 3/158* (2006.01)
*H02M 7/5387* (2007.01)
*H02P 21/08* (2016.01)
*H02P 27/06* (2006.01)

(52) U.S. Cl.
CPC ....... *H02M 7/53871* (2013.01); *H02M 1/088* (2013.01); *H02M 3/158* (2013.01); *H02M 7/5387* (2013.01); *H02P 21/08* (2013.01); *H02P 27/06* (2013.01)

(58) Field of Classification Search
CPC .. H02M 7/53871; H02M 1/088; H02M 3/158; H02M 7/5387; H02P 21/08; H02P 27/06; B60W 20/13
See application file for complete search history.

(56) References Cited

U.S. PATENT DOCUMENTS

| 5,635,804 A | * | 6/1997 | Tanaka | B60L 15/02 318/432 |
| 5,875,106 A | * | 2/1999 | Tenconi | B60L 53/20 307/26 |
| 9,231,433 B2 | * | 1/2016 | Schillinger | B60L 53/24 |
| 11,584,356 B2 | | 2/2023 | Kim | |

(Continued)

*Primary Examiner* — Yusef A Ahmed
(74) *Attorney, Agent, or Firm* — Davidson Kappel LLC

(57) ABSTRACT

An power system for an electric motor vehicle includes a power electronics unit connected to battery-side terminals, motor-side terminals and power source-side terminals. The power electronics unit including a plurality of half-bridges, each of the half-bridges including a pair of switches, each of the half-bridges connecting to a respective one of the motor-side terminals, the power electronics unit being operable to direct current from a power source through an electric motor to a battery to charge the battery by repeatedly operating the electric motor in an inductor field building phase, and then an inductor field collapse phase. The power electronics unit is operable to supply current from the power source to electric motor to establish inductor fields in the electric motor in the inductor field building phase. The power electronics unit is operable to supply current from the electric motor to the battery upon a collapse of the established inductor fields in the electric motor in the inductor field collapse phase. At least one of the half-bridges of the power electronics unit includes or is directly connected to the first power source-side terminal.

19 Claims, 7 Drawing Sheets

(56) References Cited

U.S. PATENT DOCUMENTS

| | | | | |
|---|---|---|---|---|
| 2004/0008530 | A1* | 1/2004 | Kitahata | H02M 7/5387 |
| | | | | 363/131 |
| 2010/0237694 | A1* | 9/2010 | Fuma | B60L 53/14 |
| | | | | 307/9.1 |
| 2012/0139461 | A1* | 6/2012 | Suzuki | H02P 27/085 |
| | | | | 318/400.03 |
| 2012/0176084 | A1* | 7/2012 | Klaes | B60L 53/24 |
| | | | | 320/107 |
| 2013/0069492 | A1* | 3/2013 | Rippel | B60L 53/24 |
| | | | | 310/68 D |
| 2018/0254732 | A1* | 9/2018 | Smolenaers | H02J 1/12 |
| 2019/0291585 | A1* | 9/2019 | Yang | H02M 1/4216 |
| 2020/0298722 | A1* | 9/2020 | Smolenaers | H02J 7/345 |
| 2021/0001738 | A1* | 1/2021 | Youn | B60L 15/20 |
| 2021/0016672 | A1* | 1/2021 | Zhu | H02J 7/00714 |
| 2021/0155103 | A1* | 5/2021 | Zhu | B60L 53/22 |
| 2022/0077709 | A1* | 3/2022 | Liu | H02P 27/08 |
| 2022/0176940 | A1* | 6/2022 | Kim | B60W 10/26 |
| 2022/0216714 | A1* | 7/2022 | Zhang | B60L 50/51 |
| 2022/0255417 | A1* | 8/2022 | Zhu | H02M 7/483 |
| 2022/0297555 | A1* | 9/2022 | Prasad | H02M 1/14 |
| 2022/0297557 | A1* | 9/2022 | Prasad | H02M 3/1586 |
| 2024/0128837 | A1* | 4/2024 | Mao | H02M 3/335 |
| 2024/0186811 | A1* | 6/2024 | Namuduri | H02M 7/5387 |
| 2024/0223115 | A1* | 7/2024 | Seo | H02P 27/06 |
| 2024/0359572 | A1* | 10/2024 | Luedtke | B60L 53/24 |
| 2024/0424928 | A1* | 12/2024 | Sadilek | B60L 58/16 |
| 2025/0001885 | A1* | 1/2025 | Saadat | H02K 11/21 |

* cited by examiner

POWER ELECTRONICS FOR VOLTAGE BOOST CHARGING

TECHNICAL FIELD

The present disclosure relates generally to electric vehicles, and more specifically to charging electric vehicle batteries.

BACKGROUND

Charging of higher voltage batteries from a lower voltage power source requires additional power electronics.

SUMMARY

A power system for an electric motor vehicle is provided. The electric motor vehicle includes a battery, an electric motor and a power source. The power source has a voltage lower than the battery. The electric motor is poly-phase. The power system includes a first and a second battery-side terminal for connecting to the battery; motor-side terminals each for connecting to a respective phase of the electric motor; a first and a second power source-side terminal for connecting to the power source; and a power electronics unit connected to the first and second battery-side terminals, the motor-side terminals and the first and second power source-side terminals. The power electronics unit includes a plurality of half-bridges, each of the half-bridges including a pair of switches, and each of the half-bridges connects to a respective one of the motor-side terminals. The power electronics unit is operable to direct current from the power source through the electric motor to the battery to charge the battery by repeatedly operating the electric motor in an inductor field building phase, and then an inductor field collapse phase. The power electronics unit is operable to supply current from the power source to electric motor to establish inductor fields in the electric motor in the inductor field building phase. The power electronics unit is operable to supply current from the electric motor to the battery upon a collapse of the established inductor fields in the electric motor in the inductor field collapse phase. At least one of the half-bridges of the power electronics unit includes or is directly connected to the first power source-side terminal.

In examples, the electric motor is three-phrase and the motor-side terminals include a first motor-side terminal, a second motor-side terminal and a third motor-side terminal, the plurality of half-bridges including a first half-bridge, a second half-bridge and a third half-bridge, the first motor-side terminal being on the first half-bridge, the second motor-side terminal being on the second half-bridge, and the third motor-side terminal being on the third half-bridge.

In examples, the switch pair of the first half-bridge includes: a first battery-side switch for connecting the battery via the first motor-side terminal to the electric motor in a closed state of the first battery-side switch and for disconnecting the battery from the electric motor in an open state of the first battery-side switch; and a first power source-side switch for connecting the power source to the electric motor in a closed of the first power source-side switch and for disconnecting the power source from the electric motor in an open state of the first power source-side switch, wherein the switch pair of the second half-bridge includes: a second battery-side switch for connecting the battery via the second motor-side terminal to the electric motor in a closed state of the second battery-side switch and for disconnecting the battery from the electric motor in an open state of the second battery-side switch; and a second power source-side switch for connecting the power source to the electric motor in a closed state of the second power source-side switch and for disconnecting the power source from the electric motor in an open state of the second power source-side switch, wherein the switch pair of the third half-bridge includes: a third battery-side switch for connecting the battery via the third motor-side terminal to the electric motor in a closed state of the third battery-side switch and for disconnecting the battery from the electric motor in an open state of the third battery-side switch; and a third power source-side switch for connecting the power source to the electric motor in a closed state of the third power source-side switch and for disconnecting the power source from the electric motor in an open state of the third power source-side switch.

In examples, the first half-bridge is directly connected to the first power source-side terminal of the power system by a line extending from the first half-bridge to the first power source-side terminal.

In examples, each of the half-bridges includes a battery-side switch and a power source-side switch, wherein, to orient the power electronics unit in the inductor field building phase, at least one of the power source-side switches is configured to be oriented in a closed state while at least one of the power source-side switches is configured to be oriented in an open state to cause the power source-side switches to supply current from power source into the electric motor, wherein, to orient the power electronics unit in the inductor field collapsing phase, at least one of the battery-side switches is configured to be oriented in a closed state and at least one of the battery-side switches is configured to be oriented in an open state to supply current from the motor into the battery.

In examples, the half-bridge including the power source-side switch configured to be oriented in the open state in the inductor field building phase is provided with or directly electrically connected to the first power source-side terminal.

In examples, the plurality of half-bridges is three half-bridges, wherein, to orient the power electronics unit in the inductor field building phase, two of the power source-side switches are configured to be oriented in a closed state while one of the power source-side switches is configured to be oriented in an open state to cause the power source-side switches to supply current from power source into the motor.

In examples, to orient the power electronics unit in the inductor field collapsing phase, two of the battery-side switches are configured to be oriented in a closed state and one of the battery-side switches is configured to be oriented in an open state to supply current from the motor into the battery.

In examples, the plurality of half-bridges is six half-bridges, wherein, to orient the power electronics unit in the inductor field building phase, three of the power source-side switches are configured to be oriented in a closed state while three of the power source-side switches are configured to be oriented in an open state to cause the power source-side switches to supply current from power source into the motor, wherein, to orient the power electronics unit in the inductor field collapsing phase, three of the battery-side switches are configured to be oriented in a closed state and three of the battery-side switches are configured to be oriented in an open state to supply current from the motor into the battery.

In examples, the power source-side switches are configured to form an inductor field building electrical circuit in the inductor field building phase supplying current from the power source through at least one of the power source-side switches into windings of the electric motor, the inductor field building electrical circuit being formed in part by one of the half-bridges being in electrical connection with the first power source-side terminal, the inductor field building electrical circuit boosting a voltage of the current supplied into the windings.

In examples, the battery-side switches are configured to form an inductor field collapsing electrical circuit directing the current boosted by the windings from the windings through at least one of the battery-side switches into the battery to charge the battery.

In examples, the half-bridges include a first half-bridge, a second half-bridge and a third half-bridge, the power system including a first line extending from the first half-bridge to the first power source-side terminal, the inductor field building electrical circuit including the first line.

In examples, the inductor field building electrical circuit further includes: a second line extending from the second power source-side terminal to a power source-side switch of the second half-bridge; a third line extending from the second half-bridge to a first of the motor-side terminals; and a fourth line extending from a second of the motor-side terminals to the first half-bridge.

In examples, the inductor field building electrical circuit further includes: a fifth line extending from the second line to a power source-side switch of the third half-bridge; and a sixth line extending from the third half-bridge to a third of the motor-side terminals.

A drive system for an electric motor vehicle is also provided. The drive system includes a battery, a poly-phase electric motor, and a power system. The power system includes first and second battery-side terminals connecting to the battery; motor-side terminals each connecting to a respective phase of the electric motor; first and second power source-side terminals for connecting to an external power source. The external power source has a voltage lower than the battery. The power systems includes a power electronics unit connected to the battery-side terminals, the motor-side terminals and the power source-side terminals. The power electronics unit includes a plurality of half-bridges. Each of the half-bridges includes a pair of switches, and connects to a respective one of the motor-side terminals. The power electronics unit is operable to direct current from the power source through the electric motor to the battery to charge the battery by repeatedly operating the electric motor in an inductor field building phase, and then an inductor field collapse phase. The power electronics unit is operable to supply current from the power source to electric motor to establish inductor fields in the electric motor in the inductor field building phase. The power electronics unit is operable to supply current from the electric motor to the battery upon a collapse of the established inductor fields in the electric motor in the inductor field collapse phase. The power electronics unit includes a line connecting one of the power source-side terminals to one of the half-bridges.

In examples, the electric motor is a three-phase delta motor.

In examples, the electric motor is a three-phase or six phase wye motor.

A method of charging a battery by using an electric motor to boost a voltage of a current originating from a power source is also provided. The power source has a lower voltage than the battery. The method uses a power electronics unit electrically connected to the battery, the electric motor and the power source. The power electronics unit includes a plurality of half-bridges, and each of the half-bridges includes a battery-side switch and a power source-side switch. The method includes repeating the following steps: operating the battery-side switches and the power source-side switches to form an inductor field building electrical circuit supplying current from the power source through at least one of the power source-side switches into windings of the electric motor, the inductor field building electrical circuit being formed in part by one of the half-bridges being in electrical connection with a positive terminal of the power source, the inductor field building electrical circuit boosting a voltage of the current supplied into the windings; and operating the battery-side switches and the power source-side switches to form an inductor field collapsing electrical circuit directing the current boosted by the windings from the windings through at least one of the battery-side switches into the battery to charge the battery.

BRIEF DESCRIPTION OF THE DRAWINGS

The present disclosure is described below by reference to the following drawings, in which.

DETAILED DESCRIPTION

The present disclosure provides drive systems that are configured for charging a higher voltage battery from a lower voltage source by boosting the voltage of the input power by making minimal changes to existing power electronics with virtually no modifications to existing hardware. A charging power input can be added to one of half-bridges of an inverter and timing switching of switches of the other half-bridges to generate a current flow from the lower voltage source into a higher voltage battery.

Figure 1A:
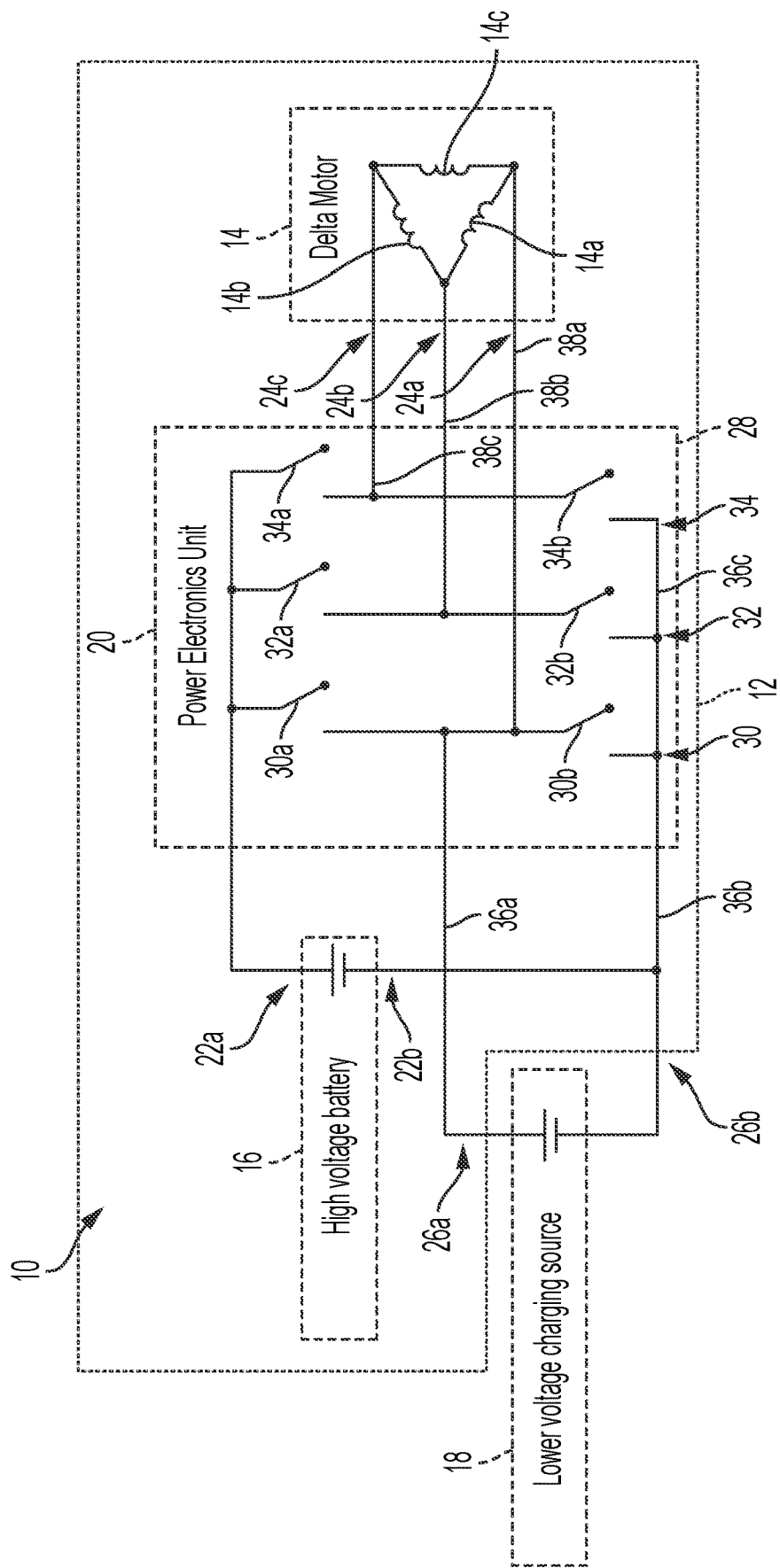
FIG. 1a schematically shows a drive system for an electric motor vehicle.

FIG. 1a schematically shows a drive system 10 for an electric motor vehicle 12. The drive system 10 includes a poly-phase electric motor 14 for powering wheels of electric motor vehicle 12 in a known manner. The drive system 10 further includes a battery 16 for powering the poly-phase electric motor 14. An external power source 18 is shown for charging the battery 16. Power source 18 has a voltage lower than a voltage of battery 16. For example, the external power source 18 can have a voltage of 400 V and the battery can have a voltage of 800 V.

The drive system 10 further includes a power system 20 for operating electric motor 14, and for charging battery 16. The power system 20 includes battery-side terminals 22a, 22b connecting to the battery 16. Specifically, power system 20 includes a cathode battery-side terminal 22a for connecting to the cathode terminal of the battery 16 and an anode battery-side terminal 22b for connecting to the anode terminal of the battery 16.

The power system 20 also includes motor-side terminals 24a, 24b, 24c each connecting to a respective phase of the electric motor 14. In the example shown in FIGS. 1a to 1c, poly-phase electric motor 14 is a three-phase delta motor including three windings 14a, 14b, 14c arranged in a triangular orientation, with the end of each winding being connected to the start of next winding to form a closed-loop.

The power system 20 further includes power source-side terminals 26a, 26b connecting to the power source 18. Specifically, power system 20 includes a positive power source-side terminal 26a for connecting to the positive terminal of the power source 18 and a negative power source-side terminal 26b for connecting to the negative terminal of the power source 18.

The power system 20 includes a power electronics unit 28, which can be an inverter, electrically connected to the battery-side terminals 22a, 22b, the motor-side terminals 24a, 24b, 24c and the power source-side terminals 26a, 26b.

The power electronics unit 28 includes a plurality of half-bridges 30, 32, 34. Each of the half-bridges 30, 32, 34 includes a pair of switches. Specifically, the first half-bridge 30 includes a first battery-side switch 30a and a first power source-side switch 30b, the second half-bridge 32 includes a second battery-side switch 32a and a second power source-side switch 32b, and the third half-bridge 34 includes a third battery-side switch 34a and a third power source-side switch 34b.

Each of the half-bridges 30, 32, 34 connects to a respective one of the motor-side terminals 24a, 24b, 24c. As described in further detail below, the power electronics unit 28 is operable to direct current from the power source 18 through the electric motor 14 to the battery 16 to charge the battery 16 by repeatedly operating the electric motor 14 in an inductor field building phase, and then an inductor field collapse phase. The power electronics unit 28 is operable to supply current from the power source 18 to the electric motor 14 to establish inductor fields in the electric motor 14 in the inductor field building phase. The power electronics unit 28 is also operable to supply current from the electric motor 14 to the battery 16 upon a collapse of the established inductor fields in the electric motor 14 in the inductor field collapse phase.

Figure 1B:
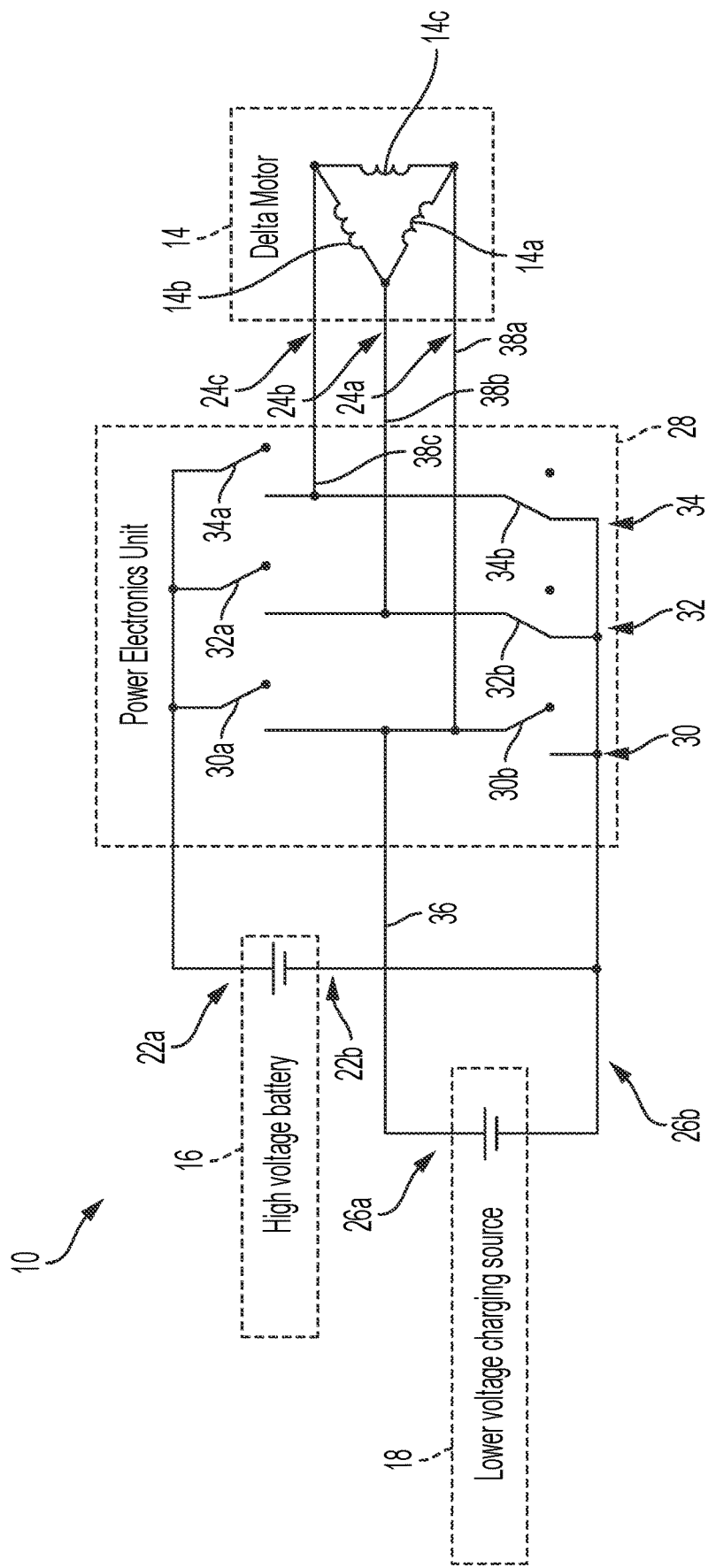
FIG. 1b shows power system in the inductor field building step of operation.
Figure 1C:
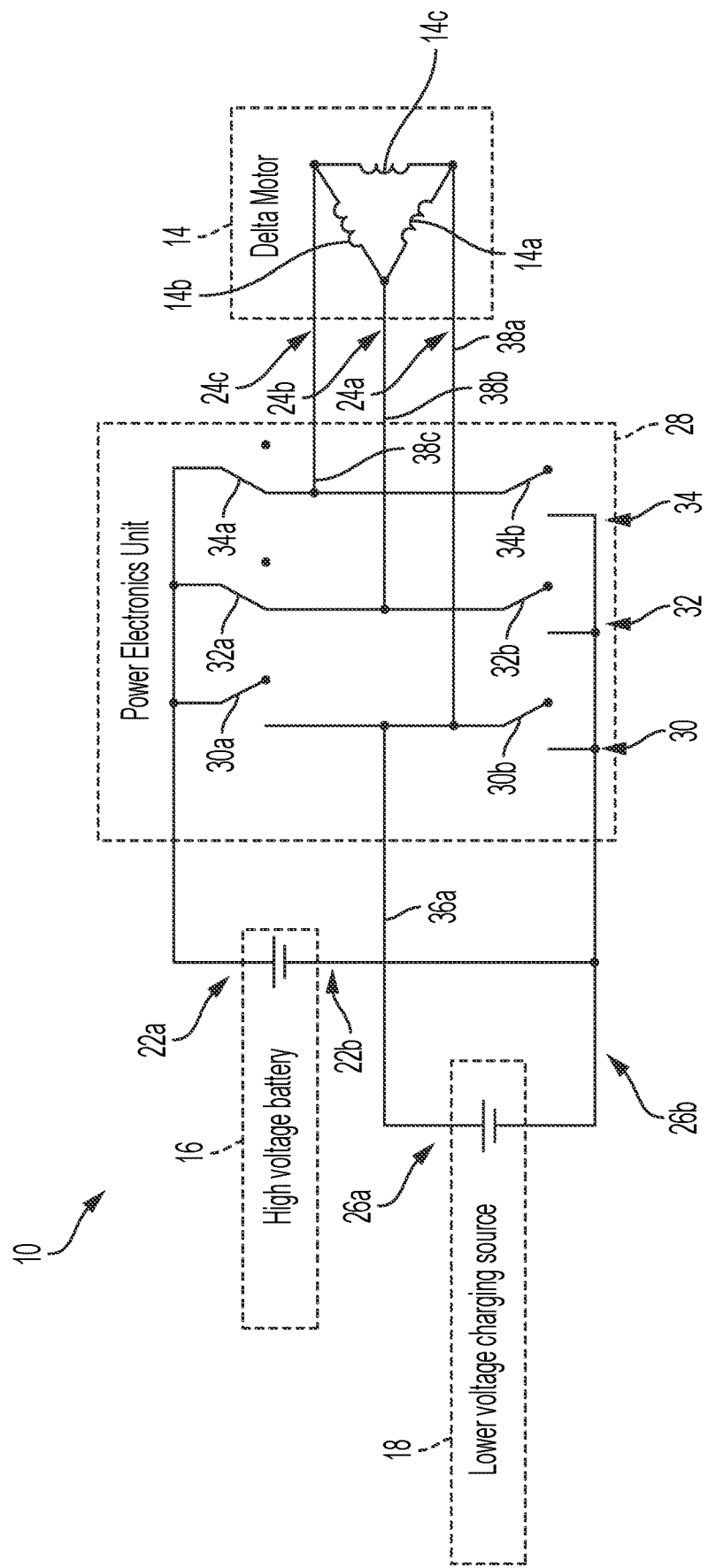
FIG. 1c shows power system in the inductor field collapse step of operation.

The power system 20 has an advantageously straightforward design, with the half-bridge 30 of the power electronics unit 28 including or being directly connected to the power source-side terminal 26a. In the example of FIGS. 1a to 1c, the half-bridge 30 of the power electronics unit 28 is directly connected to the power source-side terminal 26a by a first line 36a. In other examples, the half-bridge 30 of the power electronics unit 28 can include the power source-side terminal 26a.

The half-bridge 30, 32, 34 of the power electronics unit 28 also each includes or is directly connected to the respective motor-side terminal 24a. In the example of FIGS. 1a to 1c, the half-bridge 30 is directly connected to the first motor-side terminal 24a by a line 38a; the half-bridge 32 is directly connected to the second motor-side terminal 24b by a line 38b; and the half-bridge 34 is directly connected to the third motor-side terminal 24c by a line 38c. In other examples, the half-bridges 30, 32, 34 can include the power source-side terminals 24a, 24b, 24c, respectively.

Referring back to the switches, the switch pair of the first half-bridge 30 includes a first battery-side switch 30a for connecting the battery 16 via the first motor-side terminal 24a to the electric motor 14 in a closed state of the first battery-side switch 30a and for disconnecting the battery 16 from the electric motor 14 in an open state of the first battery-side switch. The first half-bridge 30 further includes a first power source-side switch 30b for connecting the power source 18 to the electric motor 14 in a closed state of the first power source-side switch 30b and for disconnecting the power source 18 from the electric motor 14 in an open state of the first power source-side switch 30b.

The switch pair of the second half-bridge 32 includes a second battery-side switch 32a for connecting the battery 16 via the second motor-side terminal 24b to the electric motor 14 in a closed state of the second battery-side switch 32a and for disconnecting the battery 16 from the electric motor 14 in an open state of the second battery-side switch 32a. The switch pair of the second half-bridge 32 further includes a second power source-side switch 32b for connecting the power source 18 to the electric motor 14 in a closed state of the second power source-side switch 32b and for disconnecting the power source 18 from the electric motor 14 in an open state of the second power source-side switch 32b.

The switch pair of the third half-bridge 34 includes a third battery-side switch 34a for connecting the battery 16 via the third motor-side terminal 24c to the electric motor 14 in a closed state of the third battery-side switch 34a and for disconnecting the battery 16 from the electric motor 14 in an open state of the third battery-side switch 34a. The switch pair of the third half-bridge 34 further includes a third power source-side switch 34b for connecting the power source 18 to the electric motor 14 in a closed state of the third power source-side switch 34b and for disconnecting the power source 18 from the electric motor 14 in an open state of the third power source-side switch 34b.

The power source-side switches 30b to 34b are configured to form an inductor field building electrical circuit in the inductor field building phase supplying current from the power source 18 through at least one of the power source-side switches 32b, 34b into the windings 14a to 14c of the electric motor 14. The inductor field building electrical circuit is formed in part by half-bridge 30 being in electrical connection with the first power source-side terminal 26a. The inductor field building electrical circuit boosts a voltage of the current supplied into the windings 14a to 14c.

The inductor field building electrical circuit includes the first line 36a extending from the first half-bridge 30 to the first power source-side terminal 26a, a second line 36b extending from the second power source-side terminal 26b to power source-side switch 32b of the second half-bridge 32, a third line 38b extending from the second half-bridge 32 to the motor-side terminal 24b, a fourth line 38a extending from the motor-side terminal 24a to the first half-bridge 30, a fifth line 36c extending from the second line 36b to power source-side switch 34b of the third half-bridge 34, and a sixth line 38c extending from the third half-bridge 34 to the motor side terminal 24c.

The battery-side switches 30a to 32a are configured to form an inductor field collapsing electrical circuit directing the current boosted by the windings 14a to 14c from the windings 14a to 14c through at least one of the battery-side switches 32a, 32b into the battery 16 to charge the battery.

FIG. 1b shows power system 20 in the inductor field building step of operation. In the inductor field building step, inductor fields are established in electric motor 14 by passing current through the windings 14a to 14c using power source 18. In particular, switches 32b, 34b are closed and switch 30b is open to cause current to flow from power source 18 via power source-side terminal 26b through switches 32b, 34b and lines 38b, 38c into windings 14a to 14c, Line 38a is electrically coupled to the negative terminal of power source 18 via bridge 30, line 36a and power source-side terminal 26a to complete the electrical circuit. Switches 30a, 32a, 34a are all open to isolate battery 16 and motor 14 with respect to each other.

The flow of current through windings 14a to 14c establishes a magnetic field in the motor. Windings 14a to 14c store an amount of magnetic field and acts to maintain the current that is flowing through windings 14a to 14c. After the magnetic field is created, power system 20 switched into the orientation shown in FIG. 1c.

FIG. 1c shows power system 20 in the inductor field collapse step of operation. In the inductor field collapse step, inductor fields are collapsed in electric motor 14 by disconnecting the electric motor 14 from the power source 18 by opening switches 32b, 34b in comparison with the orientation shown in FIG. 1b. Switches 32a, 34a are closed and switch 30a is open to cause current to flow from electric motor 14 via terminals 24b, 24c and lines 38b, 38c through switches 32a, 34a into battery 16 to charge battery 16. Switches 30b, 32b, 34b are all in the open state to isolate power source 18 and motor 14 with respect to each other.

During the inductor field collapse step, the inductance in the electric motor 14 attempts to maintain the flow of current in the direction of the established magnetic field. As the field collapses, the voltage can rise significantly allowing the current to flow from electric motor 14 into the battery 16. Once the field has collapsed to a degree where no or little current is flowing into the battery 16 from the motor 14, the switch states can be reversed into the orientation in and the process started again.

Figure 2A:
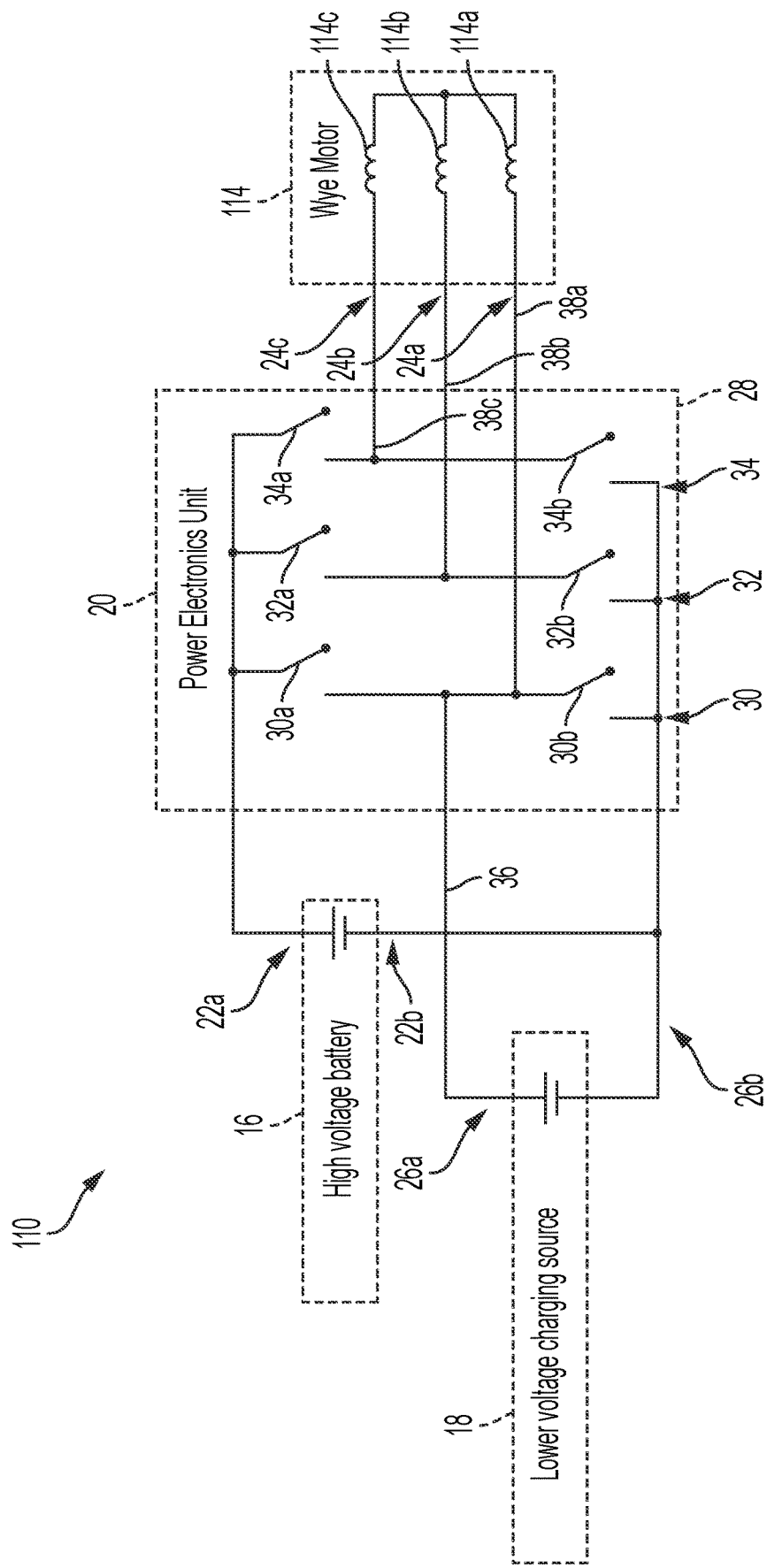
FIG. 2a schematically shows a drive system configured in the same manner as drive system in FIG. 1a, except that delta motor has been replaced by a three-phase wye motor.

FIG. 2a schematically shows a drive system 110 configured in the same manner as drive system 110 in FIG. 1a, except that delta motor 14 has been replaced by a three-phase wye motor 114, i.e., a motor including windings in a wye configuration. Drive system 110 can utilize the same power system 20 as drive system 10, illustrating the versatility of power system 20. In contrast to existing power electronics units requiring a fourth terminal (neutral terminal) for a wye motor to charge a higher voltage battery with a lower voltage power source, no such fourth terminal is required for power system 20.

Figure 2B:
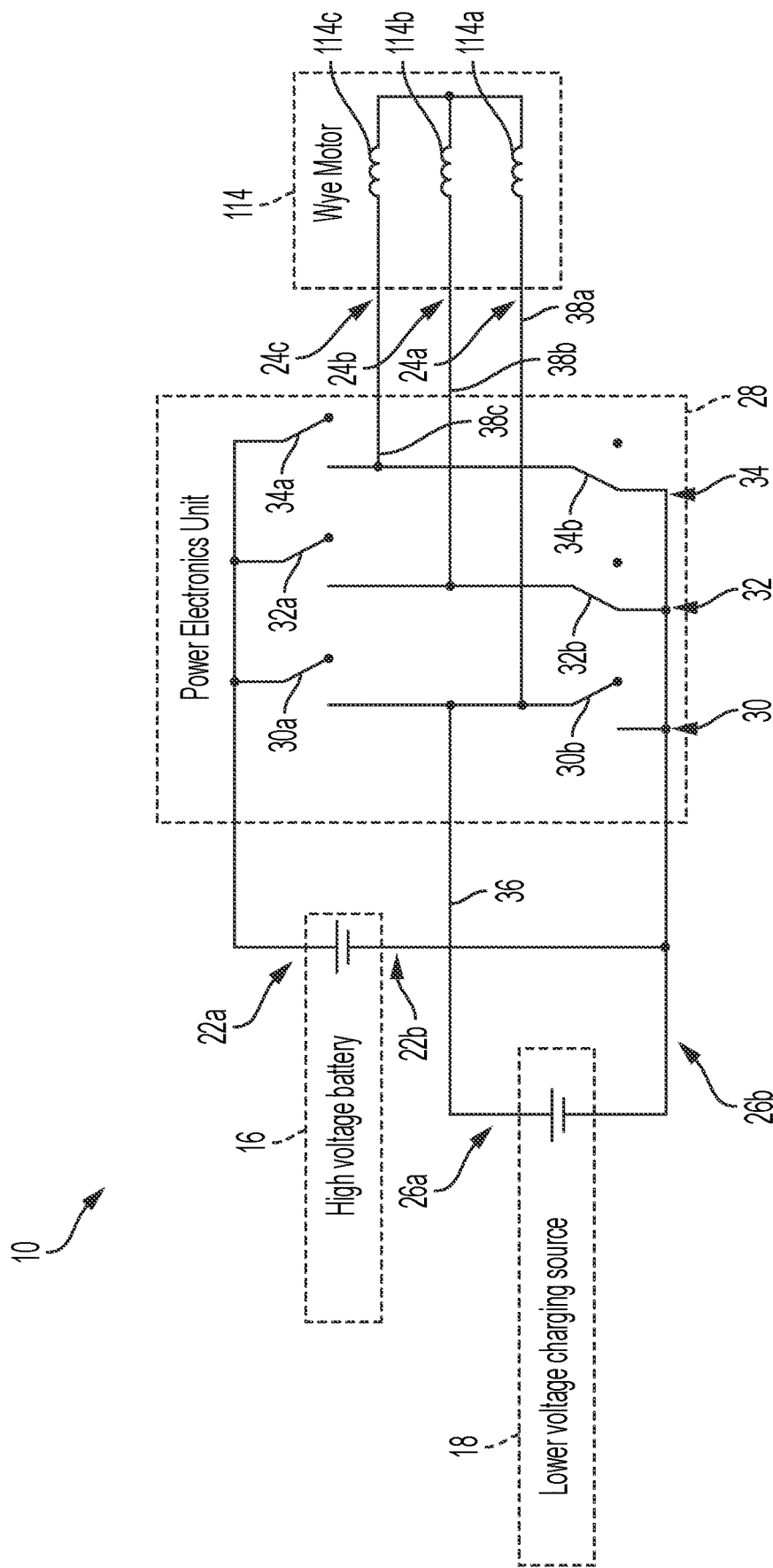
FIG. 2b, in the same manner as FIG. 1b, shows the power system in the inductor field building step of operation.
Figure 2C:
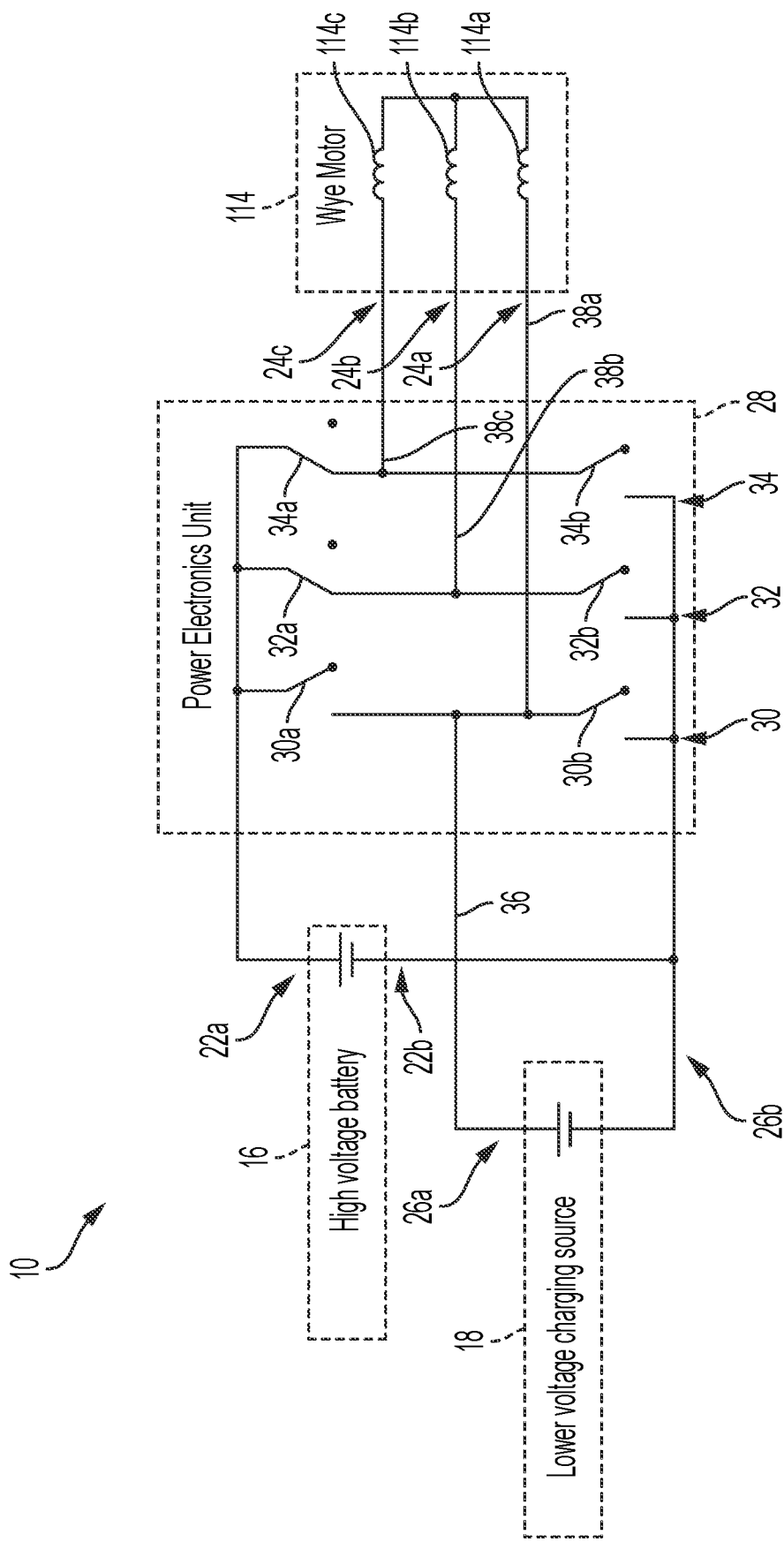
FIG. 2c, in the same manner as FIG. 1c, shows the power system in the inductor field collapse step of operation.

FIG. 2b, in the same manner as FIG. 1b, shows power system 20 in the inductor field building step of operation. FIG. 2c, in the same manner as FIG. 1c, shows power system 20 in the inductor field collapse step of operation.

Figure 3:
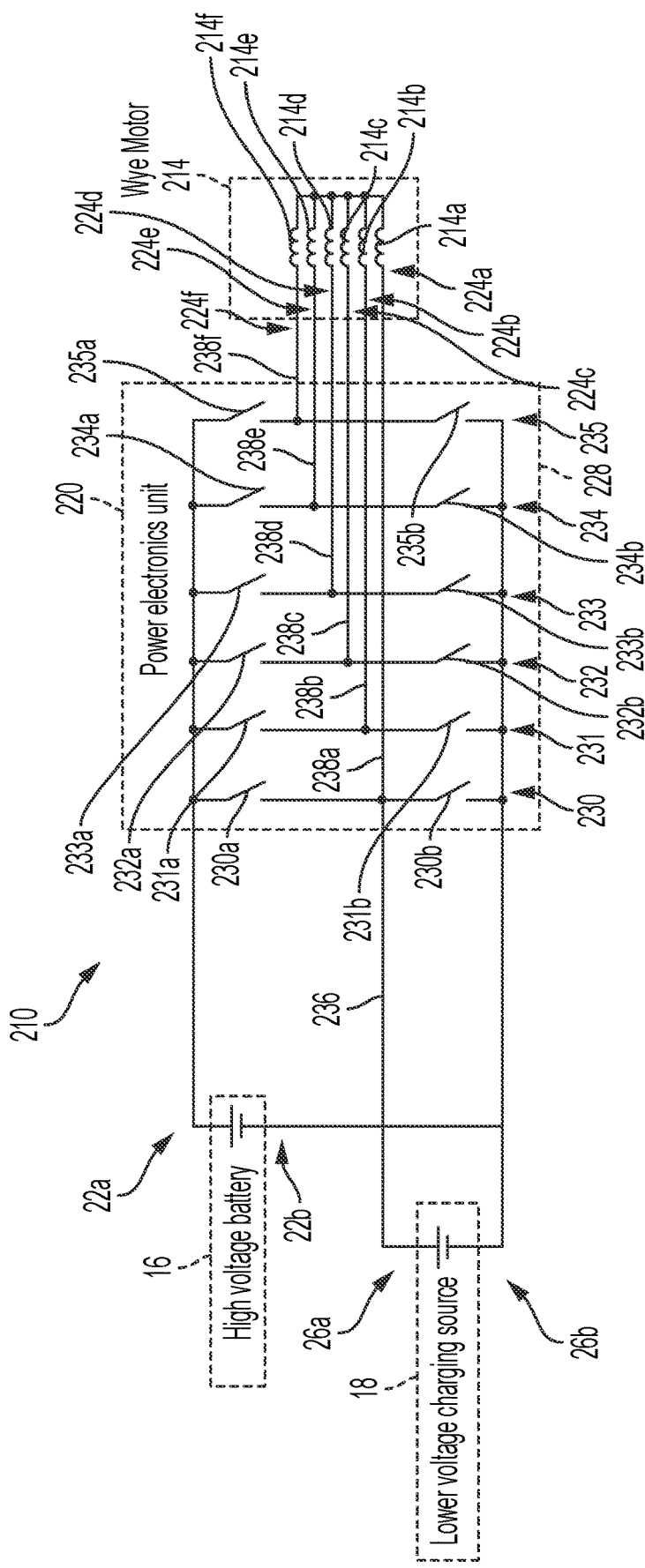
FIG. 3 schematically shows a drive system including a six-phase a wye motor for charging a battery via a power source utilizing windings of the motor.

FIG. 3 schematically shows a drive system 210 including a six-phase a wye motor 214 for charging battery 16 via power source 18 utilizing windings 214a to 214f of motor 214. The drive system 210 includes a power electronics unit 220 for operating electric motor 214, and for charging battery 16. The power electronics unit 220 includes six motor-side terminals 224a to 224f each connecting to a respective phase of the electric motor 214.

The power electronics unit 220 includes a power electronics unit 228, which can be an inverter, electrically connected to the battery-side terminals 22a, 22b, the motor-side terminals motor-side terminals 224a to 224f and the power source-side terminals 26a, 26b.

The power electronics unit 228 includes a plurality of half-bridges 230 to 235. Each of the half-bridges 230 to 235 includes a pair of switches. Specifically, the first half-bridge 230 includes a first battery-side switch 230a and a first power source-side switch 230b, the second half-bridge 231 includes a second battery-side switch 231a and a second power source-side switch 231b, the third half-bridge 232 includes a third battery-side switch 232a and a third power source-side switch 232b, the fourth half-bridge 233 includes a fourth battery-side switch 233a and a fourth power source-side switch 233b, the fifth half-bridge 234 includes a fifth battery-side switch 234a and a fifth power source-side switch 234b and the sixth half-bridge 235 includes a sixth battery-side switch 235a and a sixth power source-side switch 235b.

Each of the half-bridges 230 to 235 connects to a respective one of the motor-side terminals 224a to 224f. In the same manner as power electronics unit 28, the power electronics unit 228 is operable to direct current from the power source 18 through the electric motor 214 to the battery 16 to charge the battery 16 by repeatedly operating the electric motor 214 in an inductor field building phase, and then an inductor field collapse phase. The power electronics unit 228 is operable to supply current from the power source 18 to the electric motor 214 to establish inductor fields in the electric motor 14 in the inductor field building phase. The power electronics unit 228 is also operable to supply current from the electric motor 214 to the battery 16 upon a collapse of the established inductor fields in the electric motor 214 in the inductor field collapse phase.

The power electronics unit 220 has an advantageously straightforward design, with the half-bridge 230 of the power electronics unit 228 including or being directly connected to the power source-side terminal 26a. In the example of FIG. 3, the half-bridge 230 of the power electronics unit 28 is directly connected to the power source-side terminal 26a by a line 236. In other examples, the half-bridge 230 of the power electronics unit 228 can include the power source-side terminal 26a.

The half-bridges 230 to 235 of the power electronics unit 28 also each includes or is directly connected to the respective motor-side terminal 224a to 224f. In the example of FIG. 3, the half-bridges 230 to 235 are each directly connected to the respective first motor-side terminal 224a to 224f by a respective line 238a to 238f. In other examples, the half-bridges 230 to 235 can include the respective power source-side terminals 224a to 224f.

Referring back to the switches, each of the switch pairs of the half-bridges 230 to 235 includes a respective battery-side switch 230a to 235a for connecting the battery 16 via the respective motor-side terminal 224a to 224f to the electric motor 214 in a closed state of the battery-side switch 230a to 235a and for disconnecting the battery 16 from the electric motor 214 in an open state of the battery-side switch 230a to 235a. Each of the half-bridges 230 to 235 further includes a respective power source-side switch 230b to 235b for connecting the power source 18 to the electric motor 214 in a closed state of the power source-side switch 230b to 235b and for disconnecting the power source 18 from the electric motor 214 in an open state of the power source-side switch 230b to 235b.

The power electronics unit 220, similar to power system 20, operates by cycling between the inductor field building step of operation and the inductor field collapse step of operation. In the inductor field building step, inductor fields are established in electric motor 214 by passing current through the windings 214a to 214f using power source 18. In particular, switches 233b to 235b are closed and switches 230b to 232b are open to cause current to flow from power source 18 via power source-side terminal 26b through switches 233b to 235b and lines 238d to 238f into windings 214d to 214f. Lines 238a is electrically coupled to the negative terminal of power source 18 via bridge 230, line 236 and power source-side terminal 26a to complete the electrical circuit. Switches 230a to 235a are all open to isolate battery 16 and motor 214 with respect to each other.

The flow of current through windings 214d to 214f establishes a magnetic field in the motor. Windings 214d to 214f store an amount of magnetic field and acts to maintain the current that is flowing through windings 214d to 214f. After the magnetic field is created, power electronics unit 220 switched into the inductor field collapse step.

In the inductor field collapse step, inductor fields are collapsed in electric motor 214 by disconnecting the electric motor 214 from the power source 18 by opening switches 233b to 235b in comparison with the inductor field building step. Switches 233a to 235a are closed and switches 230a to 232a are open to cause current to flow from electric motor 214 via terminals 224d to 224f and lines 238d to 238f through switches 233a to 235a into battery 16 to charge battery 16. Switches 230b to 235b are all in the open state to isolate power source 18 and motor 214 with respect to each other.

During the inductor field collapse step, the inductance in the electric motor 214 attempts to maintain the flow of current in the direction of the established magnetic field. As the field collapses, the voltage can rise significantly allowing the current to flow from electric motor 214 into the battery 16. Once the field has collapsed to a degree where no or little current is flowing into the battery 16 from the motor 214, the switch states can be reversed into the orientation in and the process started again.

The switches in the present disclosure can be in the form of transistors in parallel with freewheeling diodes.

The power electronics units disclosed herein enables charging of a higher voltage battery from a lower voltage source by minimizing changes to existing architectures, which the main change being the addition of a charging input connection to one of the phase terminals. The power electronics units are compatible with arbitrary phase motors in delta or wye winding configurations.

REFERENCE NUMERALS 10 drive system
12 electric motor vehicle
14 electric motor
14a to 14c windings
16 battery
18 power source
20 power electronics unit
22a, 22b battery-side terminals
24a to 24c motor-side terminals
26a, 26b power source-side terminals
28 inverter
30 half-bridge
30a first battery-side switch
30b first power source-side switch
32 second half-bridge
32a second battery-side switch
32b second power source-side switch
34 third half-bridge
34a third battery-side switch
34b third power source-side switch
36a first line
36b second line
36c fifth line
38a line
38b lines
38c lines
110 drive system
114 three-phase wye motor
210 drive system
214 electric motor
214a to 214f windings
220 power electronics unit
224a motor-side terminals
224d terminals
228 power electronics unit
230 half-bridges
230a battery-side switch
230b power source-side switch
231 second half-bridge
231a second battery-side switch
231b second power source-side switch
232 third half-bridge
232a third battery-side switch
232b third power source-side switch
233 fourth half-bridge
233a switches
233b switches
234 fifth half-bridge
234a fifth battery-side switch
234b fifth power source-side switch
235 sixth half-bridge
235a sixth battery-side switch
235b sixth power source-side switch
236 line
238a respective line
238d lines

What is claimed is:

1. A power system for an electric motor vehicle, the electric motor vehicle including a battery, an electric motor and a power source, the power source having a voltage lower than the battery, the electric motor being poly-phase, the power system comprising:

first and second battery-side terminals for connecting to the battery;

motor-side terminals each for connecting to a respective phase of the electric motor;

first and second power source-side terminals for connecting to the power source;

a power electronics unit connected to the first and second battery-side terminals, the motor-side terminals and the first and second power source-side terminals, the power electronics unit including a plurality of half-bridges, each of the half-bridges including a pair of switches, each of the half-bridges connecting to a respective one of the motor-side terminals, the power electronics unit being operable to direct current from the power source through the electric motor to the battery to charge the battery by repeatedly operating the electric motor in an inductor field building phase, and then an inductor field collapse phase, the power electronics unit being operable to supply current from the power source to the electric motor to establish inductor fields in the electric motor in the inductor field building phase, the power electronics unit being operable to supply current from the electric motor to the battery upon a collapse of the established inductor fields in the electric motor in the inductor field collapse phase; and at least one of the half-bridges of the power electronics unit being directly connected to the first power source-side terminal, wherein the electric motor is three-phrase and the motor-side terminals include a first motor-side terminal, a second motor-side terminal and a third motor-side terminal, the plurality of half-bridges including a first half-bridge, a second half-bridge and a third half-bridge, and
the first motor-side terminal being on the first half-bridge, the second motor-side terminal being on the second half-bridge, and the third motor-side terminal being on the third half-bridge.

2. The power system as recited in claim 1, wherein the switch pair of switches of the first half-bridge includes:
a first battery-side switch for connecting the battery via the first motor-side terminal to the electric motor in a closed state of the first battery-side switch and for disconnecting the battery from the electric motor in an open state of the first battery-side switch; and
a first power source-side switch for connecting the power source to the electric motor in a closed of the first power source-side switch and for disconnecting the power source from the electric motor in an open state of the first power source-side switch,
wherein the pair of switches of the second half-bridge includes:
a second battery-side switch for connecting the battery via the second motor-side terminal to the electric motor in a closed state of the second battery-side switch and for disconnecting the battery from the electric motor in an open state of the second battery-side switch; and
a second power source-side switch for connecting the power source to the electric motor in a closed state of the second power source-side switch and for disconnecting the power source from the electric motor in an open state of the second power source-side switch,
wherein the pair of switches of the third half-bridge includes:
a third battery-side switch for connecting the battery via the third motor-side terminal to the electric motor in a closed state of the third battery-side switch and for disconnecting the battery from the electric motor in an open state of the third battery-side switch; and
a third power source-side switch for connecting the power source to the electric motor in a closed state of the third power source-side switch and for disconnecting the power source from the electric motor in an open state of the third power source-side switch.

3. The power system as recited in claim 2, wherein the first half-bridge is directly connected to the first power source-side terminal of the power system by a line extending from the first half-bridge to the first power source-side terminal.

4. A drive system for the electric motor vehicle, the drive system comprising:
the power system as recited in claim 1.

5. The drive system as recited in claim 4, wherein the electric motor is a three-phase delta motor.

6. The drive system as recited in claim 4, wherein the electric motor is a three-phase or six phase wye motor.

7. A method of charging the battery by using the electric motor to boost a voltage of a current originating from the power source, the power system according to claim 1,
wherein each of the half-bridges including a battery-side switch and a power source-side switch, the method comprising repeating the following steps:
operating the battery-side switches and the power source-side switches to form the inductor field building electrical circuit supplying the current from the power source through at least one of the power source-side switches into windings of the electric motor, the inductor field building electrical circuit being formed in part by one of the half-bridges being in electrical connection with a positive terminal of the power source, the inductor field building electrical circuit boosting the voltage of the current supplied into the windings; and
operating the battery-side switches and the power source-side switches to form the inductor field collapsing electrical circuit directing the current boosted by the windings from the windings through at least one of the battery-side switches into the battery to charge the battery.

8. A power system for an electric motor vehicle, the electric motor vehicle including a battery, an electric motor and a power source, the power source having a voltage lower than the battery, the electric motor being poly-phase, the power system comprising:
first and second battery-side terminals for connecting to the battery;
motor-side terminals each for connecting to a respective phase of the electric motor;
first and second power source-side terminals for connecting to the power source;
a power electronics unit connected to the first and second battery-side terminals, the motor-side terminals and the first and second power source-side terminals,
the power electronics unit including a plurality of half-bridges, each of the half-bridges including a pair of switches, each of the half-bridges connecting to a respective one of the motor-side terminals, the power electronics unit being operable to direct current from the power source through the electric motor to the battery to charge the battery by repeatedly operating the electric motor in an inductor field building phase, and then an inductor field collapse phase,
the power electronics unit being operable to supply current from the power source to the electric motor to establish inductor fields in the electric motor in the inductor field building phase,
the power electronics unit being operable to supply current from the electric motor to the battery upon a collapse of the established inductor fields in the electric motor in the inductor field collapse phase; and
at least one of the half-bridges of the power electronics unit being directly connected to the first power source-side terminal,
wherein each of the half-bridges includes a battery-side switch and a power source-side switch,
wherein, to orient the power electronics unit in the inductor field building phase, at least one of the power source-side switches is configured to be oriented in a closed state while at least one of the power source-side switches is configured to be oriented in an open state to cause the power source-side switches to supply current from power source into the electric motor,
wherein, to orient the power electronics unit in the inductor field collapsing phase, at least one of the battery-side switches is configured to be oriented in a closed state and at least one of the battery-side switches is configured to be oriented in an open state to supply current from the electric motor into the battery, and
wherein the half-bridge including the power source-side switch configured to be oriented in the open state in the inductor field building phase is provided with or directly electrically connected to the first power source-side terminal.

9. The power system as recited in claim 8, wherein the plurality of half-bridges is three half-bridges,
wherein, to orient the power electronics unit in the inductor field building phase, two of the power source-side switches are configured to be oriented in a closed state while one of the power source-side switches is configured to be oriented in an open state to cause the power source-side switches to supply current from power source into the electric motor.

10. The power system as recited in claim 9, wherein, to orient the power electronics unit in the inductor field collapsing phase, two of the battery-side switches are configured to be oriented in a closed state and one of the battery-side switches is configured to be oriented in an open state to supply current from the electric motor into the battery.

11. The power system as recited in claim 8, wherein the plurality of half-bridges is six half-bridges,
wherein, to orient the power electronics unit in the inductor field building phase, three of the power source-side switches are configured to be oriented in a closed state while three of the power source-side switches are configured to be oriented in an open state to cause the power source-side switches to supply current from power source into the electric motor, and
wherein, to orient the power electronics unit in the inductor field collapsing phase, three of the battery-side switches are configured to be oriented in a closed state and three of the battery-side switches are configured to be oriented in an open state to supply current from the electric motor into the battery.

12. A drive system for the electric motor vehicle, the drive system comprising:
the power system as recited in claim 8.

13. A method of charging the battery by using the electric motor to boost a voltage of a current originating from the power source,
the method using the power system according to claim 8, the method comprising repeating the following steps:
operating the battery-side switches and the power source-side switches to form the inductor field building electrical circuit supplying the current from the power source through at least one of the power source-side switches into windings of the electric motor, the inductor field building electrical circuit being formed in part by one of the half-bridges being in electrical connection with a positive terminal of the power source, the inductor field building electrical circuit boosting the voltage of the current supplied into the windings; and
operating the battery-side switches and the power source-side switches to form the inductor field collapsing electrical circuit directing the current boosted by the windings from the windings through at least one of the battery-side switches into the battery to charge the battery.

14. A power system for an electric motor vehicle, the electric motor vehicle including a battery, an electric motor and a power source, the power source having a voltage lower than the battery, the electric motor being poly-phase, the power system comprising:
first and second battery-side terminals for connecting to the battery;
motor-side terminals each for connecting to a respective phase of the electric motor;
first and second power source-side terminals for connecting to the power source;
a power electronics unit connected to the first and second battery-side terminals, the motor-side terminals and the first and second power source-side terminals,
the power electronics unit including a plurality of half-bridges, each of the half-bridges including a pair of switches, each of the half-bridges connecting to a respective one of the motor-side terminals, the power electronics unit being operable to direct current from the power source through the electric motor to the battery to charge the battery by repeatedly operating the electric motor in an inductor field building phase, and then an inductor field collapse phase,
the power electronics unit being operable to supply current from the power source to the electric motor to establish inductor fields in the electric motor in the inductor field building phase,
the power electronics unit being operable to supply current from the electric motor to the battery upon a collapse of the established inductor fields in the electric motor in the inductor field collapse phase; and
at least one of the half-bridges of the power electronics unit being directly connected to the first power source-side terminal,
wherein each of the half-bridges includes a battery-side switch and a power source-side switch,
wherein the power source-side switches are configured to form an inductor field building electrical circuit in the inductor field building phase supplying current from the power source through at least one of the power source-side switches into windings of the electric motor, the inductor field building electrical circuit being formed in part by one of the half-bridges being in electrical connection with the first power source-side terminal, the inductor field building electrical circuit boosting a voltage of the current supplied into the windings, and
wherein the battery-side switches are configured to form an inductor field collapsing electrical circuit directing the current boosted by the windings from the windings through at least one of the battery-side switches into the battery to charge the battery.

15. The power system as recited in claim 14, wherein the half-bridges include a first half-bridge, a second half-bridge and a third half-bridge,
the power system including a first line extending from the first half-bridge to the first power source-side terminal, the inductor field building electrical circuit including the first line.

16. The power system as recited in claim 15, wherein the inductor field building electrical circuit further includes:
a second line extending from the second power source-side terminal to the power source-side switch of the second half-bridge;
a third line extending from the second half-bridge to a first of the motor-side terminals; and
a fourth line extending from a second of the motor-side terminals to the first half-bridge.

17. The power system as recited in claim 16, wherein the inductor field building electrical circuit further includes:
a fifth line extending from the second line to the power source-side switch of the third half-bridge; and
a sixth line extending from the third half-bridge to a third of the motor-side terminals.

18. A drive system for the electric motor vehicle, the drive system comprising:
the power system as recited in claim 14.

19. A method of charging the battery by using the electric motor to boost a voltage of a current originating from the power source,
the method using the power system according to claim 14, the method comprising repeating the following steps:
operating the battery-side switches and the power source-side switches to form the inductor field building electrical circuit supplying the current from the power source through at least one of the power source-side switches into windings of the electric motor, the inductor field building electrical circuit being formed in part by one of the half-bridges being in electrical connection with a positive terminal of the power source, the inductor field building electrical circuit boosting the voltage of the current supplied into the windings; and operating the battery-side switches and the power source-side switches to form the inductor field collapsing electrical circuit directing the current boosted by the windings from the windings through at least one of the battery-side switches into the battery to charge the battery.

\* \* \* \* \*